June 30, 1964    W. LEHNER ETAL    3,139,304
YIELDABLE VEHICLE SEAT

Filed Oct. 19, 1961    4 Sheets-Sheet 1

Inventors:
Wilhelm Lehner
Alfred Kirshofer by: Michael S. Striker
Attorney

June 30, 1964  W. LEHNER ETAL  3,139,304
YIELDABLE VEHICLE SEAT

Filed Oct. 19, 1961  4 Sheets-Sheet 3

3,139,304
YIELDABLE VEHICLE SEAT
Wilhelm Lehner, Grosshelfendorf, and Alfred Kinshofer, Wornsmuhl, near Miesbach, Germany, assignors to Georg Fritzmeier, Grosshelfendorf, near Munich, Germany
Filed Oct. 19, 1961, Ser. No. 146,143
Claims priority, application Germany Oct. 26, 1960
7 Claims. (Cl. 297—308)

The present invention relates to seats which are yieldably supported and which are used in vehicles of all types, particularly work vehicles.

Although spring-supported vehicle seats of this type are known, the conventional seats of this type are not fully satisfactory. The principal defect arises in connection with the spring structure which yieldably supports the seat. If a very soft springy action is provided so as to provide the ideal yieldable support for light loads, then this spring support operates in a completely unsatisfactory manner when heavy loads are applied to the seat, and on the other hand if the spring support is suitable for heavy loads then of course an entirely unsatisfactory very hard support is provided for light loads. Of course, it is possible to provide a spring structure which is designed for a compromise between these two extremes, but in this event the best possible springing action both for light loads and for heavy loads is sacrificed.

It is accordingly a primary object of the present invention to provide a yieldable vehicle seat having a spring-supporting structure which will provide an entirely satisfactory soft springing action under light load and which at the same time will, during application of heavy loads, also provide a springy action which will be as good as those which can be obtained from conventional spring structure specifically designed for heavy loads.

Another object of the present invention is to provide a structure of the above type which will stress the components of the structure to an extent less than the extent to which corresponding components of the conventional structures are stressed.

A further object of the present invention is to provide a structure of the above type wherein the friction of the moving parts, particularly at the spring assembly, is less than that which obtains with conventional structures of this type.

An additional object of the present invention is to provide a yieldable seat structure which is quite simple and rugged and which will provide a long life of useful service without any maintenance.

With these objects in view the invention includes a vehicle seat having a seat portion and a back portion which is fixed to the rear of and extends upwardly from the seat portion, and located to the rear of and adjacent to this back portion is an elongated guide means which guides the seat for up and down movement. Elastic means is connected at one end to the guide means and at an opposite end to the back portion of the seat for yieldably resisting downward movement of the seat when a load is applied thereto, and, in accordance with the present invention, this elastic means provides a resistance to downward movement of the seat, when the latter is loaded, which varies by an extent which is more than proportional to the extent of downward movement of the seat when a load is applied thereto.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
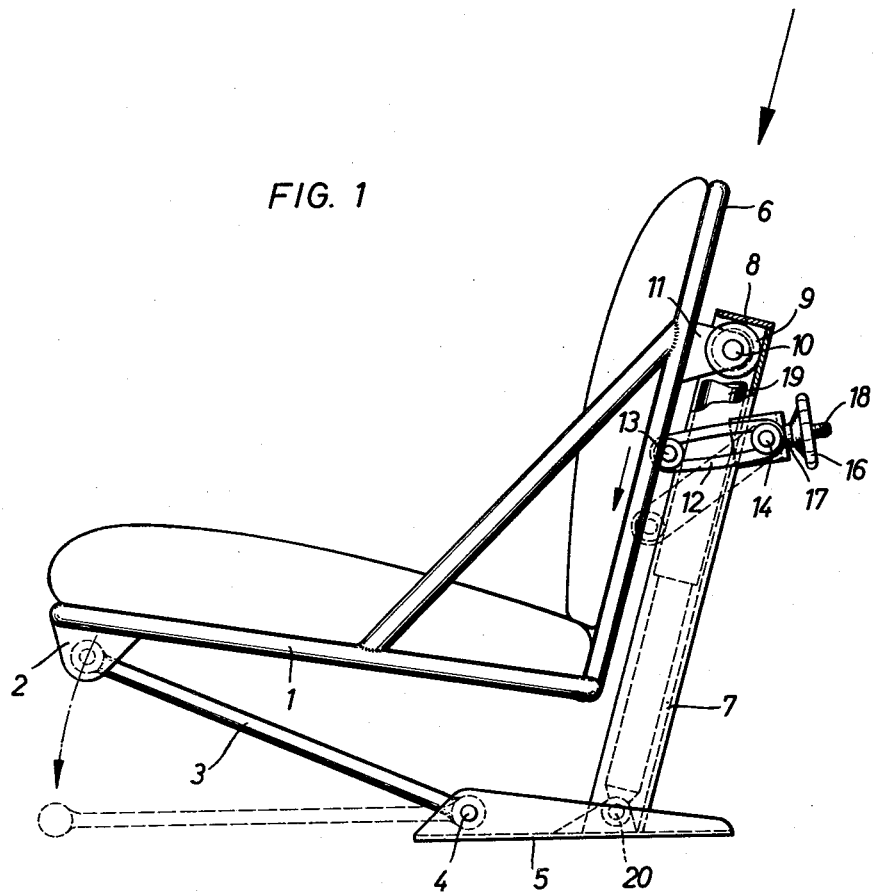
FIG. 1 is a side elevation, partly in section, of a yieldable vehicle seat according to the present invention.
Figure 2:
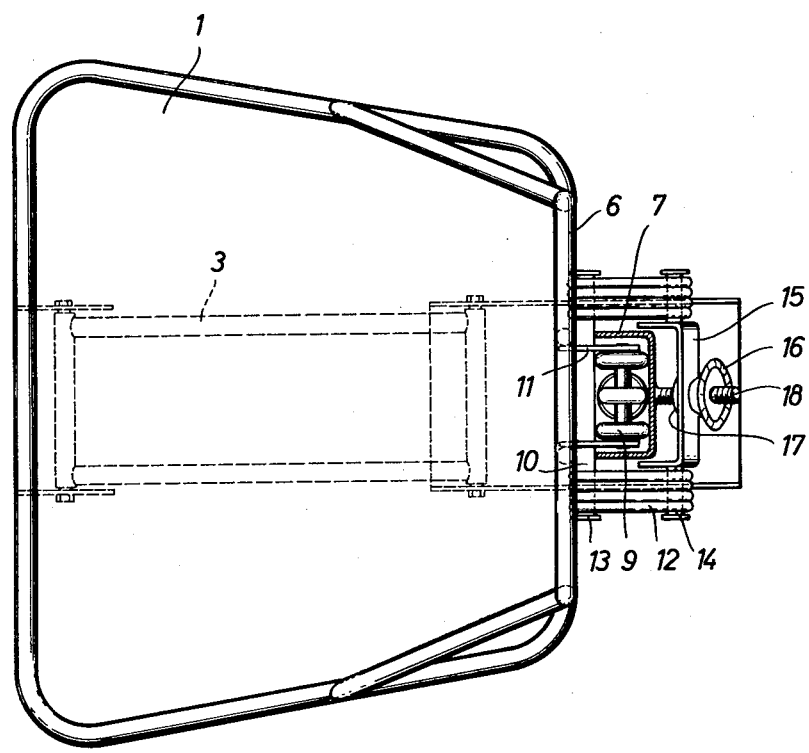
FIG. 2 is a top plan view of the structure of FIG. 1.

Referring now to FIGS. 1 and 2, the yieldable vehicle seat illustrated therein includes a lower seat portion 1 which fixedly carries at its lower front edge a bearing 2. This bearing 2 serves to pivotally connect to the seat portion 1 the front end of an elongated lever means formed by the swing lever 3 which is located beneath the central portion of the lower seat portion 1, as is particularly apparent from FIG. 2. The rear end of the lever 3 is pivotally connected by way of a bearing 4 to the base plate 5. In order to provide a secure connection of the lever means 3 to the seat, this lever means 3 is relatively wide, as shown in FIG. 2, and for this purpose it is of advantage to form the entire lever assembly 3 from a plurality of bars or tubes which are assembled together as by welding or the like so as to form an elongated frame.

The seat includes, in addition to the lower seat portion 1, a back portion 6 which is fixed to the rear of and extends upwardly from the seat portion 1, and a guide means is located adjacent to and to the rear of the back portion 6 so as to guide the seat 1, 6 for up and down movement, and this guide means includes the elongated guide member 7 which is rigidly fixed at its lower end to the base plate 5 and which extends upwardly and rearwardly therefrom, so that this guide member 7 guides the seat 1, 6 for movement in the direction in which a load is conventionally applied thereto, as indicated by the arrow at the upper right portion of FIG. 1. The guide member 7 is in the form of an elongated channel member of U-shaped cross-section, and the hollow interior of the elongated channel member 7 is directed toward the front, facing the rear portion 6 of the seat 1, 6. At its upper end the elongated hollow channel member 7 is closed by a plate 8 which is rigidly fixed to the channel member 7 and which forms a stop member. The guide means includes in addition to the elements 7, 8 a roller 9 which rides in the hollow interior of the elongated channel member 7 and which is in rolling contact with the rear wall portion of the elongated channel member 7, and it will be noted that the stop member 8 fixed to the top end of the channel member 7 cooperates with the roller 9 to limit the upward movement thereof and thus limit the upward movement of the seat, this roller 9 being fixedly connected to the back portion 6 of the seat by way of a bracket 11 which is fixed directly to the back portion 6 and which carries a pin 10 which serves to turnably support the roller 9.

In accordance with the present invention an elastic means is provided for yieldably resisting the downward movement of the seat 1, 6, and this elastic means in the illustrated example takes the form of a plurality of elastic members 12. In the construction shown in the drawing these elastic members 12 are in the form of elongated rubber rings, but it is equally possible to use instead of these rubber rings other types of springs. These rubber rings 12 are connected on the one hand to the seat at its back portion 6 and on the other hand to the guide means 7, in a manner described below, so as to yieldably resist the downward movement of the seat 1, 6 when a load is applied thereto, and in accordance with the present invention the elastic means provides a resistance to downward movement of the seat, when a load is applied thereto, which varies to an extent which is more than proportional to the extent to which the seat moves downwardly. It will be noted that the elastic means is composed of a plurality of the elastic members 12 respectively located on opposite sides of the channel member 7, and in the illustrated example of FIGS. 1 and 2 there are four elastic members 12 located on each side of the channel member 7. An elongated horizontally extending bar 13 is fixed to the back portion 6 at the rear face thereof beneath the bracket 11, and the several endless spring members 12 extend around the bar 13 so as to be connected to the seat in this manner. The rear ends of the endless spring members 12 extend around a pair of pins 14 which are respectively fixed to and extending from the opposed ends of a U-shaped member 15 which receives a part of the guide member 7 in its interior, this member 15 being freely turnable on a nut 17 which carries the member 15 and which has a manually engageable handle portion 16 available to the operator so that the operator may conveniently turn the nut 17, the member 15 while being freely turnable on the nut 17 being incapable of shifting axially with respect thereto. An elongated screw member 18 is fixed, as by welding, to the rear surface of the guide member 7 and extends rearwardly therefrom and threadedly carries the nut 17. The spring elements 12 are shown in solid lines in FIG. 1 in the rest position of the seat when it is unloaded, and it will be noted from FIG. 1 that in this rest position the connection of the elastic means to the seat, by way of the bar 13, is substantially at the same elevation as the connection of the elastic means to the guide means, by way of the elements 14–18. In fact the connection of the elastic means to the guide means is only slightly higher in elevation than the connection of the elastic means to the seat. Furthermore, as is readily apparent from FIG. 1, the screw member 18 extends in substantially the same direction that the spring means or elastic means extends when the seat is not loaded, and of course the turning of the nut 17 will result in providing in the elastic means a pretension, and of course when the nut is turned it is displaced along the axis of the screw 18 in exactly the same direction that the elastic means itself extends so as to provide in a very efficient manner a desired pretension in the elastic means. It will be noted that the elastic means, in addition to yieldably resisting downward movement of the seat in the manner described above when a load is applied thereto, also urges the roller 9 to engagement with the rear elongated wall portion of the channel 7. The pretension in the elastic means guarantees that the roller 9 will roll smoothly along the channel 7 and will not have any vibration or chatter with respect thereto, and on the other hand the pretension is capable of adjusting the elastic means according to the weight of the load to be applied to the seat. Thus, the tension applied to the elastic means 12 when it is in its rest position shown in FIG. 1 will be different for a heavy person and a light person. It will be noted that in the rest position shown in FIG. 1 the elastic means 12 is inclined downwardly toward the left, and this angular inclination should never be greater than 30° with respect to a horizontal plane. This type of spring support meets all of the requirements encountered in a yieldably supported vehicle seat.

Under certain circumstances it is desirable to provide a damping of the seat movement, and for this purpose there may be provided, in accordance with the invention, a damping means 19 in the form of a hydraulic damping device which is conventional and which has its lower end connected to the pivot 20 which is carried by the base plate 5. The upper end of the hydraulic damping device 19 is connected to the shaft 10 which turnably supports the roller 9. As may be seen from FIG. 2, there are actually three rollers 9 distributed along the shaft 10 and located between the side walls of the bracket 11. The elongated damping means can conveniently be located in the hollow interior of the elongated channel member 7. It is used when the elastic means is formed by coil springs or other metallic spring members. When using rubber rings, as shown in FIGS. 1 and 2, the damping means 19 may also be used but it may be omitted, if desired, since with rubber rings there is a strong inherent damping action.

Figure 3:
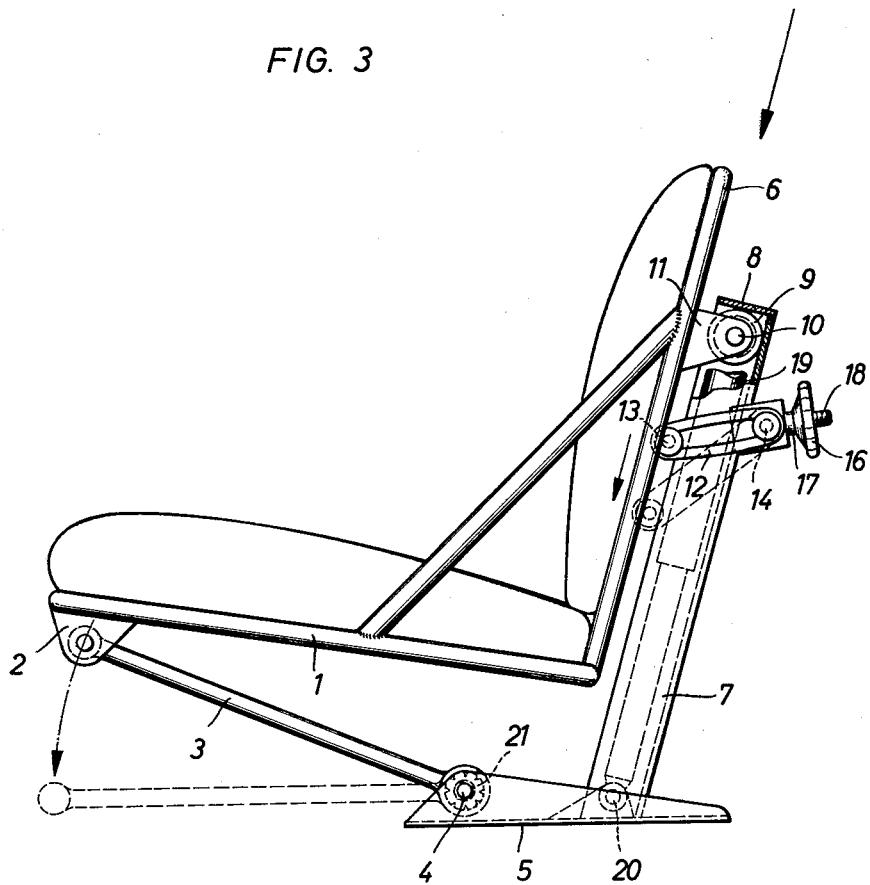
FIG. 3 is a side elevation of another embodiment of a yieldable vehicle seat according to the present invention.
Figure 4:
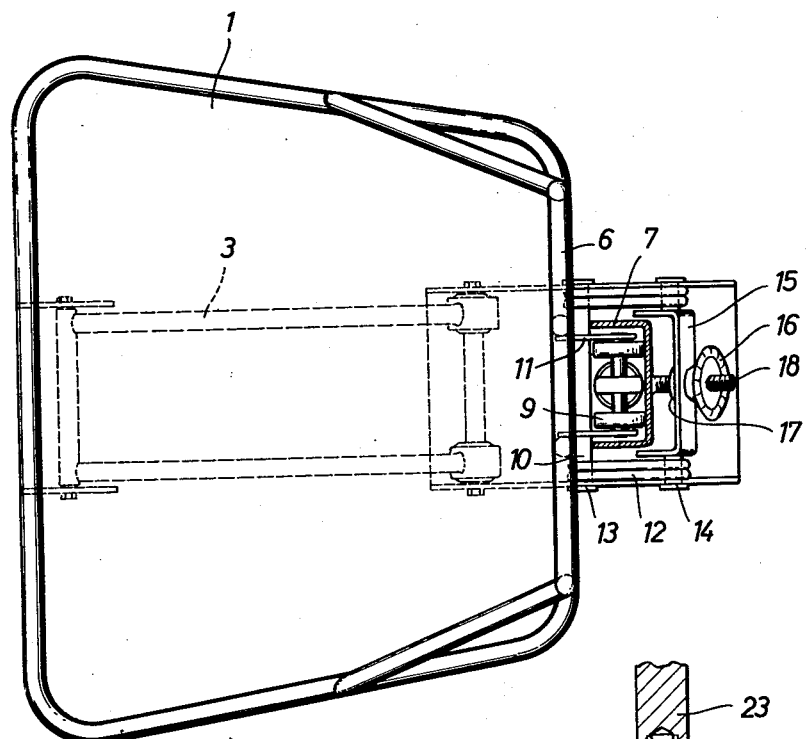
FIG. 4 is a top plan view of the structure of FIG. 3.
Figure 5:
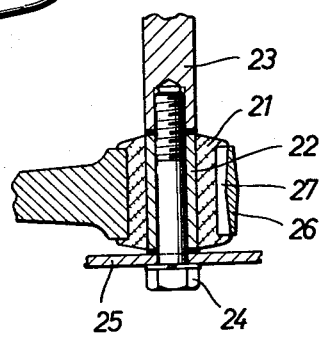
FIG. 5 is a fragmentary sectional view of a detail which forms part of the structure of the invention.

In the embodiment of the invention which is illustrated in FIGS. 3–5, the above-described structure is included, and all of the parts are shown with the same reference characters. It will be noted that insofar as the above-described structure is concerned, there are in FIG. 4 only two elastic members 12 on each side of the guide 7, whereas four of these members are provided in the embodiment of FIGS. 1 and 2. The only other difference between the structure of FIGS. 3–5 and that of FIGS. 1 and 2 is that in the structure of FIGS. 3–5 there is a torsion spring located at one of the turning axes of the lever means 3. In the illustrated example a torsion spring means 21 is located at the bearing 4 for the lower rear end of the lever means 3. As is indicated in FIG. 4 the frame which forms the lever 3 has a pair of rear portions which are turnably supported by the pivot of the bearing 4, and at each of these rear portions is located the torsion spring structure which is shown in greatest detail is FIG. 5.

Thus, referring to FIG. 5 it will be seen that a torsion spring 21 is provided, this torsion spring being in the form of a tubular body of rubber which is vulcanized onto a central sleeve 22 which passes through the body of rubber 21. The pivot 23 is stationary and the lever 3 turns with respect to the pivot 23, and the sleeve 22 is fixed to the stationary pivot 23. For this purpose a bolt 24 passes through an opening in the side plate 25 of the base 5, and this bolt 24 is threaded into a threaded bore formed in the end of the rod 23. The bolt 24 of course passes through the sleeve 22 so that, with a suitable washer or the like interposed at each end of the sleeve 22, when the bolt 24 is tightened the sleeve 22 and of course the torsion spring 21 therewith will be rigidly fixed and will in this way be rigidly joined to the stationary rod 23 and the side plate 25 of the base 5. The torsion spring 21 is surrounded by and located within an eye 26 located at the rear of the lever 3, and in order to fix the body 21 to the eye 26 the eye 26 carries a plurality of inwardly extending projections 27 in the form of elongated ribs, similar to splines, and these projections by pressing into the rubber body 21 prevent relative turning between the latter and the eye 26. As was mentioned above, the structure which is shown in FIG. 5 is duplicated at both sides of the rear end of the lever 3, and with this construction when the forward end of the lever 3 turns downwardly upon applying a load to the seat, the pair of torsion members 21 will twist and yieldably resist downward movement of the seat. Of course, instead of using rubber it is also possible to make the members 21 of a suitable plastic. Furthermore it is possible to use a coil spring which acts as a torsion spring. Moreover, if desired, it is possible to locate a torsion spring or other type of spring structure at the forward end of the lever 3.

Inasmuch as, with the structure of FIGS. 3–5, part of the load is taken over by the torsion springs 21, it is possible to provide the elastic means connected to the seat and the guide means with a smaller number of elastic members 12. Thus, the volume of space occupied by the elastic means 12 of FIGS. 3–5 is less than that of FIGS. 1 and 2, so that the embodiment of FIGS. 3–5 is more compact at the rear of the seat where the elastic means 12 is located.

It will be noted that with the structure of the invention there is a relatively small amount of friction at the elastic means, and of course with the elements 12 of FIGS. 3–5 being smaller in number than those of FIGS. 1 and 2, there is less friction with FIGS. 3–5 than with FIGS. 1 and 2.

It will be understood that each of the elements described above, or two or more together, may also find a useful application in other types of seats differing from the types described above.

While the invention has been illustrated and described as embodied in yieldably supported seats, it it not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A yieldable vehicle seat comprising, in combination, a lower seat portion and a back portion fixed to the rear of and extending upwardly from said lower seat portion; guide means located to the rear of and adjacent to said back portion for guiding said seat and back portions for up and down movement, said guide means including an elongated guide member extending in a substantially vertical direction; elastic means yieldably resisting downward movement of said back and seat portions, said elastic means including at least one elastic member located on one side of said guide member and at least one other elastic member located on the other side of said guide member, said elastic members being connected to said back portion and extending therefrom in a predetermined direction when said back and seat portions are not loaded; a screw member fixed to said guide member at the elevation of said elastic means and extending from the rear of said guide member away from said back portion approximately in the same direction that said elastic means extends when said seat and back portions are not loaded; a nut threadedly carried by said screw member, so that by turning said nut the position thereof along said screw member can be adjusted; a substantially U-shaped member turnably carried by said nut, said guide member being received at least in part in said U-shaped member, and said elastic members of said elastic means being connected to said U-shaped member so that by turning said nut the pretension of the elastic members of said elastic means may be adjusted.

2. A yieldable vehicle seat comprising, in combination, a lower seat portion and back portion fixed to the rear of and extending upwardly from said lower seat portion; guide means located to the rear of and adjacent to said back portion for guiding said seat and back portions for up and down movement, said guide means including an elongated guide member extending in a substantially vertical direction; elastic means yieldably resisting downward movement of said back and seat portions, said elastic means including at least one elastic member located on one side of said guide member and at least one other elastic member located on the other side of said guide member, said elastic members being connected to said back portion and extending therefrom in a predetermined direction when said back and seat portions are not loaded; a screw member fixed to said guide member at the elevation of said elastic means and extending from the rear of said guide member away from said back portion approximately in the same direction that said elastic means extends when said seat and back portions are not loaded; a nut threadedly carried by said screw member, so that by turning said nut the position thereof along said screw member can be adjusted; a substantially U-shaped member turnably carried by said nut, said guide member being received at least in part in said U-shaped member, and said elastic members of said elastic means being connected to said U-shaped member so that by turning said nut the pretension of the elastic members of said elastic means may be adjusted; elongated lever means located beneath said seat portion, having a rear end turnable about a stationary axis, and having a front end turnably connected to said seat portion adjacent a front edge thereof; and yieldable spring means cooperating with said lever means for yieldably resisting turning thereof when a load is carried by said seat portion.

3. A yieldable vehicle seat comprising, in combination, a lower seat portion and back portion fixed to the rear of and extending upwardly from said lower seat portion; guide means located to the rear of and adjacent to said back portion for guiding said seat and back portions for up and down movement, said guide means including an elongated guide member extending in a substantially vertical direction; elastic means yieldably resisting downward movement of said back and seat portions, said elastic means including at least one elastic member located on one side of said guide member and at least one other elastic member located on the other side of said guide member, said elastic members being connected to said back portion and extending therefrom in a predetermined direction when said back and seat portions are not loaded; a screw member fixed to said guide member at the elevation of said elastic means and extending from the rear of said guide member away from said back portion approximately in the same direction that said elastic means extends when said seat and back portions are not loaded; a nut threadedly carried by said screw member, so that by turning said nut the position thereof along said screw member can be adjusted; a substantially U-shaped member turnably carried by said nut, said guide member being received at least in part in said U-shaped member, and said elastic members of said elastic means being connected to said U-shaped member so that by turning said nut the pretension of the elastic members of said elastic means may be adjusted; elongated lever means located beneath said seat portion, having a rear end turnable about a stationary axis, and having a front end turnably connected to said seat portion adjacent a front edge thereof; and torsion spring means operatively connected to said lever means at at least one of the turning axes thereof for yieldably resisting downward movement of said seat and back portions when a load is applied thereto.

4. A yieldable vehicle seat comprising, in combination, a lower seat portion and back portion fixed to the rear of and extending upwardly from said lower seat portion; guide means located to the rear of and adjacent to said back portion for guiding said seat and back portions for up and down movement, said guide means including an elongated guide member extending in a substantially vertical direction, said guide member being in the form of an elongated channel of substantially U-shaped cross-section having a hollow interior directed toward said back portion and said guide means including a roller carried by said back portion at the rear thereof and located in the interior of said channel in rolling contact therewith; elastic means yieldably resisting downward movement of said back and seat portions, said elastic means including at least one elastic member located on one side of said guide member and at least one other elastic member located on the other side of said guide member, said elastic members being connected to said back portion and extending therefrom in a predetermined direction when said back and seat portions are not loaded; a screw member fixed to said guide member at the elevation of said elastic means and extending from the rear of said guide member away from said back portion approximately in the same direction that said elastic means extends when said seat and back portions are not loaded; a nut threadedly carried by said screw member, so that by turning said nut the position thereof along said screw member can be adjusted; a substantially U-shaped member turnably carried by said nut, said guide member being received at least in part in said U-shaped member, and said elastic members of said elastic means being connected to said U-shaped member so that by turning said nut the pretension of the elastic members of said elastic means may be adjusted; elongated lever means located beneath said seat portion, having a rear end turnable about a stationary axis, and having a front end turnably connected to said seat portion adjacent a front edge thereof; and torsion spring means operatively connected to said lever means at at least one of the turning axes thereof for yieldably resisting downward movement of said seat and back portion when a load is applied thereto.

5. A yieldable vehicle seat comprising, in combination, a lower seat portion and back portion fixed to the rear of and extending upwardly from said lower seat portion; guide means located to the rear of and adjacent to said back portion for guiding said seat and back portions for up and down movement, said guide means including an elongated guide member extending in a substantially vertical direction, said guide member being in the form of an elongated channel of substantially U-shaped cross-section having a hollow interior directed toward said back portion and said guide means including a roller carried by said back portion at the rear thereof and located in the interior of said channel in rolling contact therewith; elastic means yieldably resisting downward movement of said back and seat portions, said elastic means including at least one elastic member located on one side of said guide member and at least one other elastic member located on the other side of said guide member, said elastic members being connected to said back portion and extending therefrom in a predetermined direction when said back and seat portions are not loaded; a screw member fixed to said guide member at the elevation of said elastic means and extending from the rear of said guide member away from said back portion approximately in the same direction that said elastic means extends when said seat and back portions are not loaded; a nut threadedly carried by said screw member, so that by turning said nut the position thereof along said screw member can be adjusted; a substantially U-shaped member turnably carried by said nut, said guide member being received at least in part in said U-shaped member, and said elastic members of said elastic means being connected to said U-shaped member so that by turning said nut the pretension of the elastic members of said elastic means may be adjusted; elongated lever means located beneath said seat portion, having a rear end turnable about a stationary axis, and having a front end turnably connected to said seat portion adjacent a front edge thereof; torsion spring means operatively connected to said lever means at at least one of the turning axes thereof for yieldably resisting downward movement of said seat and back portion when a load is applied thereto; and damping means located in said channel for damping movement of said seat and back portions.

6. A yieldable vehicle seat comprising, in combination, a lower seat portion and back portion fixed to the rear of and extending upwardly from said lower seat portion; guide means located to the rear of and adjacent to said back portion for guiding said seat and back portions for up and down movement, said guide means including an elongated guide member extending in a substantially vertical direction, said guide member being in the form of an elongated channel of substantially U-shaped cross-section having a hollow interior directed toward said back portion and said guide means including a roller carried by said back portion at the rear thereof and located in the interior of said channel in rolling contact therewith; elastic means yieldably resisting downward movement of said back and seat portions, said elastic means including at least one elastic member located on one side of said guide member and at least one other elastic member located on the other side of said guide member, said elastic members being connected to said back portion and extending therefrom in a predetermined direction when said back and seat portions are not loaded; a screw member fixed to said guide member at the elevation of said elastic means and extending from the rear of said guide member away from said back portion approximately in the same direction that said elastic means extends when said seat and back portions are not loaded; a nut threadedly carried by said screw member, so that by turning said nut the position thereof along said screw member can be adjusted; a substantially U-shaped member turnably carried by said nut, said guide member being received at least in part in said U-shaped member, and said elastic members of said elastic means being connected to said U-shaped member so that by turning said nut the pretension of the elastic members of said elastic means may be adjusted; elongated lever means located beneath said seat portion, having a rear end turnable about a stationary axis, and having a front end turnably connected to said seat portion adjacent a front edge thereof; torsion spring means operatively connected to said lever means at at least one of the turning axes thereof for yieldably resisting downward movement of said seat and back portion when a load is applied thereto; and damping means located in said channel for damping movement of said seat and back portions, said channel extending upwardly and rearwardly.

7. A yieldable vehicle seat comprising, in combination, a lower seat portion and a back portion fixed to the rear of and extending upwardly from said lower seat portion; guide means located to the rear of and adjacent to said back portion for guiding said seat and back portions for up and down movement, said guide means including an elongated guide member extending in a substantially vertical direction; elastic means yieldably resisting downward movement of said back and seat portions, said elastic means including at least one elastic member connected at one end to said back portion and extending therefrom in a predetermined direction when said back and seat portions are not loaded; a screw member fixed to said guide member at the elevation of said elastic means and extending from the rear of said guide member away from said back portion approximately in the same direction that said elastic means extends when said seat and back portions are not loaded; a nut threadedly carried by said screw member so that by turning said nut the position thereof along said screw member can be adjusted; and a member turnably carried by said nut, and said elastic member being connected to said member so that by turning said nut the pretension of the elastic member of said elastic means may be adjusted.

References Cited in the file of this patent

UNITED STATES PATENTS

| | | |
|---|---|---|
| 1,278,643 | Hasty | Sept. 10, 1918 |
| 1,767,757 | Harris | June 24, 1930 |
| 1,770,321 | Mougeotte | July 8, 1930 |
| 2,570,177 | Wood | Oct. 2, 1951 |
| 2,629,427 | McIntyre | Feb. 24, 1953 |

FOREIGN PATENTS

| | | |
|---|---|---|
| 14,029 | Great Britain | Nov. 19, 1914 |
| 674,251 | Great Britain | June 18, 1952 |